(12) United States Patent
Voigt

(10) Patent No.: US 8,974,753 B2
(45) Date of Patent: Mar. 10, 2015

(54) PRECIPITATION OF ZINC FROM SOLUTION

(75) Inventor: Paul Benjamin Voigt, Nundah (AU)

(73) Assignee: Glencore Queensland Limited, Brisbane, Queensland (AU)

( * ) Notice: Subject to any disclaimer, the term of this patent is extended or adjusted under 35 U.S.C. 154(b) by 0 days.

(21) Appl. No.: 13/982,158

(22) PCT Filed: Jan. 27, 2012

(86) PCT No.: PCT/AU2012/000066
§ 371 (c)(1),
(2), (4) Date: Jan. 3, 2014

(87) PCT Pub. No.: WO2012/103571
PCT Pub. Date: Aug. 9, 2012

(65) Prior Publication Data
US 2014/0105797 A1    Apr. 17, 2014

(30) Foreign Application Priority Data
Jan. 27, 2011    (AU) .................. 2011900253

(51) Int. Cl.
*C22B 19/34* (2006.01)
*C22B 3/00* (2006.01)
(52) U.S. Cl.
CPC ............. *C22B 19/26* (2013.01); *C22B 19/34* (2013.01)
USPC ........................ 423/105; 423/101

(58) Field of Classification Search
None
See application file for complete search history.

(56) References Cited

U.S. PATENT DOCUMENTS 6,726,889 B2    4/2004    Choi et al.

FOREIGN PATENT DOCUMENTS

| JP | 59-142895 A | 8/1984 |
|----|-------------|--------|
| JP | 09-235117 A | 9/1997 |

OTHER PUBLICATIONS

International Search Report for PCT/AU2012/000066 dated Mar. 14, 2012.
International Preliminary Report on Patnetability for PCT/AU2012/000066 dated Dec. 12, 2012.

*Primary Examiner* — Melissa Swain
(74) *Attorney, Agent, or Firm* — Michael F. Krieger; Kirton McConkie

(57) ABSTRACT

A method of precipitating a zinc containing solid from an acidic solution containing dissolved zinc and magnesium comprising contacting the solution with a calcium containing neutralizing agent to raise the pH of the solution to 4.5 to 7.5 at a temperature of from 70 to 95° C. to thereby precipitate a solid zinc containing material and gypsum without causing substantial precipitation of magnesium, and separating the zinc containing material from the gypsum.

19 Claims, 2 Drawing Sheets

PRECIPITATION OF ZINC FROM SOLUTION

FIELD OF THE INVENTION

The present invention relates to a process for the precipitation of zinc from solution

BACKGROUND TO THE INVENTION

Lead and zinc are invariably found together in nature. For example, the ore body located at Mount Isa, Queensland, Australia includes ore that contains both lead and zinc.

The lead/zinc ore at Mount Isa is mined and formed into two concentrates, a lead and a zinc concentrate. Separation between lead and zinc is not perfect, so some zinc reports to the lead concentrate and vice versa. The lead concentrate is sent to a lead smelter. The lead smelter converts the concentrate into lead metal and slag. The slag contains various fluxing agents used in the lead smelting operations and a significant quantity of zinc. The zinc content of the slag may vary between 10 to 15% by weight. The slag at Mount Isa has an average zinc content of around 12% by weight. The slag also contains significant quantities of iron, silica and calcium oxide. For example, the slag may comprise around 23% by weight iron, around 21% by weight silica and around 23% by weight calcium oxide.

As the slag derived from the lead smelting operations contains significant quantities of zinc, it represents a potentially valuable resource from which zinc can be recovered. Significant efforts have been expended over the previous 40 years to try to develop a process to recover the zinc from the slag derived from the lead smelting process. The most commonly used is the slag fuming, producing a zinc oxide that requires further treatment to remove deleterious impurities.

One problem encountered in previous efforts to recover zinc by hydrometallurgy from the lead smelter slag arises due to the presence of large amounts of silica (typically in excess of 20% by weight) in the slag. If the slag is subjected to a leaching step to leach the zinc from the slag using sulphuric acid as the leaching agent, silica is also dissolved in the leaching step. However, the dissolved silica then tends to form insoluble compounds that are in the form a gel which is extremely difficult, if not impossible, to separate from the liquor.

Another problem relates to the recovery of zinc from solution into a saleable form. The industry accepted way to achieve this is by removing all contaminants from solution by solvent extraction or purification and electrowinning to produce a relatively pure zinc product. This method to recover zinc is not possible in some regions, such as Mount Isa in Queensland as there is no access to sufficient electricity generating capacity for electrowinning. As a result, processes to precipitate the zinc as an oxide concentrate have been adopted in some instances. For example, the process described in U.S. Pat. No. 6,726,889 (the entire contents of which are herein incorporated by cross reference) has been trialled successfully to recover a high grade zinc oxide concentrate. In U.S. Pat. No. 6,726,889 a process is described where zinc sulphate solution is contacted with hydrated lime at pH of preferably from 8.5-9.5, typically at pH of 9.5, at a minimum 75° C., typically 90° C., to produce a zinc oxide and gypsum. The zinc sulphate solution contains zinc, silica and iron. The two products (zinc oxide and gypsum) can be separated gravimetrically and separation is improved by growing the gypsum through seed recycle. When a split size at approximately 30 µm is achieved, a high quality zinc oxide concentrate results. Excellent zinc recoveries and concentrate grades have been obtained in pilot testwork using this method. For example, zinc grades of over 65% and recoveries of over 90% have been achieved. However, magnesium that is leached from slag and carried through in solution with zinc reports to the concentrate under the described operating conditions. The resulting magnesium concentration, between 3-4%, is such that the concentrate attracts significant penalties when sold to a zinc refinery. As a result, the process described by U.S. Pat. No. 6,726,889 is not suitable to produce a saleable concentrate from slag leaching solution. The magnesium concentration is such that the zinc oxide concentrate can only be sold with significant financial penalties, making the overall process unfavourable.

The applicant does not concede that the prior arts discussed in this specification forms part of the common general knowledge in Australia or elsewhere.

Throughout this specification, the term "comprising" or its grammatical equivalents are to be taken to have an inclusive meaning unless the context of use indicates otherwise.

BRIEF DESCRIPTION OF THE INVENTION

It is an object to the present invention and to provide an improved process for precipitating zinc from an acidic solution containing dissolved zinc and magnesium.

In a first aspect, the present invention provides a method of precipitating a zinc containing solid from an acidic solution containing dissolved zinc and magnesium comprising contacting the solution with a calcium containing neutralising agent to raise the pH of the solution to 4.5 to 7.5 at a temperature of from 70 to 95° C. to thereby precipitate a solid zinc containing material and gypsum without causing substantial precipitation of magnesium, and separating the zinc containing material from the gypsum.

Under the operating conditions set out above, it has been found that the solids precipitated in the precipitation step contain a significant amount of sub-30 µm solids that include a substantial portion of the precipitated zinc and a significant amount of +30 µm solids that include a substantial portion of the precipitated calcium salts (typically gypsum). Thus, it is possible to separate the sub 30 µm solids from the +30 µm solids to effect a separation between the zinc-containing fine particles and the calcium-containing coarse particles.

In one embodiment of the present invention, the process comprises contacting the solution with a calcium containing neutralising agent to raise the pH of the solution to 5.5 to 7.5, more preferably 6.5 to 7.5 at a temperature of from 70 to 95° C., preferably about 90° C., to thereby precipitate a solid zinc containing material and gypsum without causing substantial precipitation of magnesium, and separating the zinc containing material from the gypsum. In this embodiment, the calcium containing neutralising agent is suitably in the form of lime (CaO) or hydrated lime (Ca(OH)$_2$). Zinc in solution will be precipitated in the form of zinc oxide in this embodiment.

In embodiments of the present invention where the zinc in solution is precipitated as zinc oxide, the process involves a precipitation step that is operated in a range where zinc will be precipitated and magnesium will remain in solution. In some embodiments, the operating conditions include pH from 5.5-6.5 but preferably about 6.5 and an operating temperature of from 70 to 95° C., preferably about 90° C. The calcium containing neutralising agent is suitably in the form of lime (CaO) or hydrated lime (Ca(OH)$_2$).

All other aspects of the process of step (a) may be the same as described in U.S. Pat. No. 6,276,889 (the entire contents of which are herein incorporated by cross reference), such as residence time, the requirement for seeding of gypsum crystals and separation of zinc oxide and gypsum by gravity or by size or by flotation (or by a combination of teo or more of gravity, size and flotation). The gypsum fraction from the separation may be recycled to the process. The zinc oxide fraction may be thickened and filtered where the filtrate is bled or recycled to ensure control of dissolved magnesium in solution.

In another embodiment, the process comprises contacting the solution with a calcium containing neutralising agent to raise the pH of the solution to 4.5 to 6.5, preferably 5.0 to 6.0, at a temperature of from 70 to 95° C. preferably about 90° C., to precipitate a solid zinc containing material and gypsum without causing substantial precipitation of magnesium, and separating the zinc containing material from the gypsum. In this embodiment, the calcium containing neutralising agent is suitably limestone ($CaCO_3$) and the zinc in solution is precipitated as zinc carbonate.

The "zinc carbonate process" is a variant of U.S. Pat. No. 6,726,889 where the process is operated at conditions where zinc is precipitated and magnesium is not. The calcium containing neutralising agent is suitably limestone ($CaCO_3$) There are many differences between hydrated lime and limestone. The apparent difference is the chemical composition but an important difference in this application is the reactivity. Limestone is capable of precipitating zinc from solution, but it isn't as reactive as hydrated lime and therefore significantly more limestone is required to precipitate the zinc, for example up to 50%, than the stoichiometric requirement due to unreacted limestone. One possible mechanism that causes this arises where the limestone particle becomes coated in a gypsum layer and remains inert. The other avenue for unreactive limestone is that the driving force for complete reaction is not as high with limestone compared to hydrated lime. Generally speaking, the case where gypsum coats the particle can be overcome by regrinding the material to liberate the limestone surfaces but this is not amenable to the process as grinding will break down the gypsum particles potentially rendering them less than 30 μm and reporting to the concentrate but likely interfering with the seeding/gypsum growth cycle. The driving force issue that limits limestone reactivity can be overcome by re-treating the solids with fresh feed.

In one embodiment, milled limestone is contacted with zinc sulphate solution at pH 5.0-6.0 but more preferably pH about 5.5 at a temperature of from 70 to 95° C., preferably about 90° C. The milled limestone may have a nominal size of less than 100 μm, such as about 75 μm. Zinc carbonate and gypsum will precipitate. The slurry is then passed to a separator to separate the zinc carbonate and gypsum from the solution. For example, the separator may be a thickener where the overflow (which may contain sub 30 μm particles that include a significant proportion of the precipitated zinc carbonate) is sent forward to zinc polishing (as not all zinc may be removed from solution) or for solid/liquid separation. The underflow (which may contain +30 μm particles that include a significant proportion of the precipitated gypsum and unreacted limestone) from the first thickener may be recycled to another reactor or directly to a reaction vessel or thickener, preferably at about 90° C., to contact all or just a portion of the incoming fresh zinc sulphate stream from the leach process. In this stage, any unreacted limestone from zinc precipitation is converted to gypsum. Minimal zinc would be precipitated from solution at this stage as reaction of unreacted limestone would dominate. The slurry from this stage is sent to a second separator and the liquid stream (overflow), which still contains dissolved zinc, is sent for zinc precipitation with limestone. The underflow from the second separator may be sent to zinc solution polishing to remove any zinc from solution or may be sent straight to gravity separation where any precipitated zinc carbonate would report to the fine fraction and the coarse gypsum fraction would be recycled to the process. The concentrate could then be passed to a further separator, such as a thickener and filter. The cake may be washed to remove any magnesium in solution and also remove any zinc should a zinc polishing step be excluded. The zinc polishing step may be conducted by any known method and could be a continuously stirred tank reactor (CSTR) contacting the slurry and hydrated lime at suitable conditions, such as pH 6.5, to precipitate any zinc from solution.

In one embodiment of the present invention, the precipitation step results in a slurry containing precipitated zinc carbonate and gypsum being formed. This slurry may be separated into a zinc carbonate-rich fraction and a gypsum-rich fraction, the gypsum-rich fraction containing precipitated gypsum and unreacted limestone. The zinc carbonate-rich fraction may comprise sub 30 μm particles that include a significant proportion of precipitated zinc carbonate and the gypsum-rich fraction may comprise +30 μm particles that include a significant proportion of precipitated gypsum and unreacted limestone. The zinc carbonate-rich fraction may be sent forward to zinc polishing (as not all zinc may be removed from solution) or for solid/liquid separation. The gypsum-rich fraction may be recycled to another reactor or sent directly to a reaction vessel or thickener, preferably at about 90° C., to contact all or a portion of fresh zinc sulphate stream from a leach process to convert unreacted limestone to gypsum. The resulting slurry may be separated into a liquid stream and a solids stream. The liquid-stream, which contains dissolved zinc, may be sent to zinc precipitation with limestone and the solids stream may be sent to zinc solution polishing to remove any zinc from solution or sent straight to separation where any precipitated zinc carbonate is separated from precipitated gypsum. The precipitated zinc carbonate may report to a fine fraction and the precipitated gypsum may report to a coarse fraction. The precipitated gypsum may be recycled to the process. The precipitated zinc carbonate may be subjected to a liquid/solid separation and the solid may be washed to remove any magnesium in solution. The washed solids may be recovered s a zinc carbonate concentrate.

In all embodiments of the present invention, it may be possible to separate the precipitated zinc containing compound from gypsum using flotation, granulometric sizing or a combination of flotation and granulometric sizing.

In order to further understand the present invention, a preferred embodiment will be described with reference to the accompanying drawings.

DETAILED DESCRIPTION OF THE DRAWINGS

It will be appreciated that the attached drawing has been provided for the purposes of describing a preferred embodiment of the present invention. Thus, it will be understood that the present invention should not be considered to be limited to the features as shown in the attached drawing.

In the attached drawings, the pregnant leach solution comprises an acidic leach solution containing dissolved zinc and dissolved magnesium. The pregnant leach solution has suitably been treated to remove iron, silica and other metals (Al, As, Sb, etc) for the leach solution using known technology.

Figure 1:
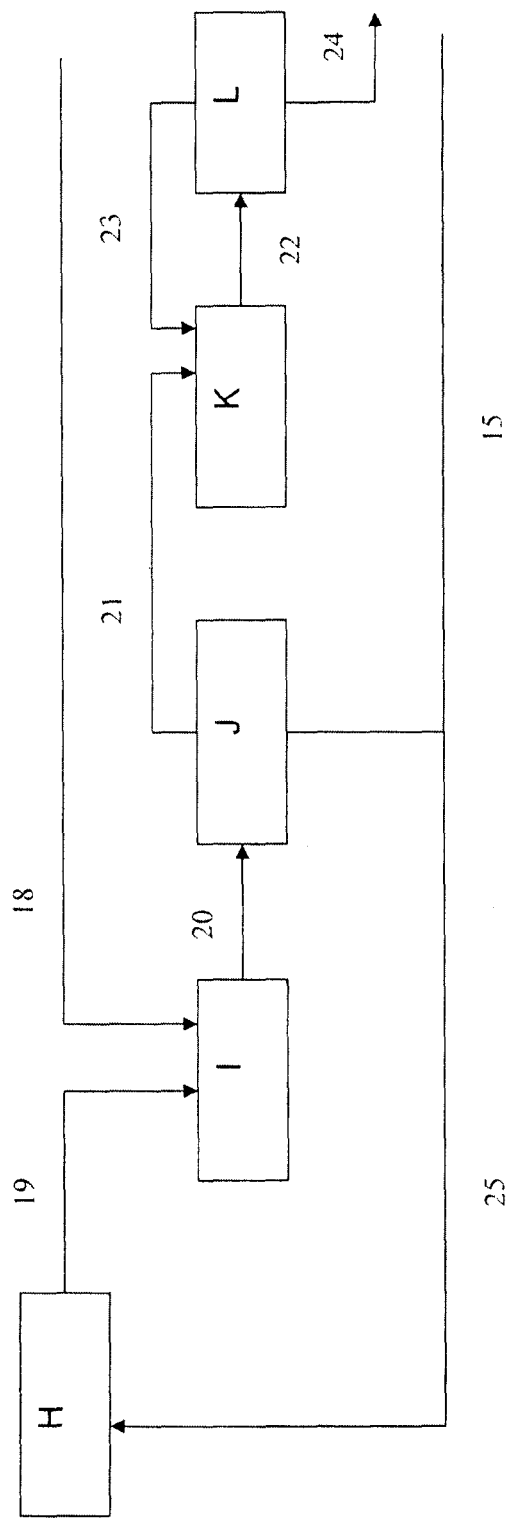
FIGS. 1 and 2 show flow sheets of embodiments of the process of the present invention.

FIG. 1 shows zinc recovery using zinc oxide precipitation. In FIG. 1, a pregnant leach solution 18 may be fed to zinc oxide precipitation I as described in U.S. Pat. No. 6,726,889, the entire contents of which are herein incorporated by cross reference. However it should be noted that different process conditions to those described in U.S. Pat. No. 6,726,889 are employed to prevent the precipitation of magnesium and magnesium reporting to the concentrate. The preferred process conditions are pH 6.5 at 70-90° C. This pH is significantly lower than the pH of 9.5 specified in the examples of U.S. Pat. No. 6,726,889. In this step, lime 19 is added to the liquid. The lime may be hydrated lime ($Ca(OH)_2$) or lime (CaO). Steam may also be required for heating, but if CaO is added, the heat released by the exothermic hydration reaction to form $Ca(OH)_2$ may be sufficient to heat the solution to the desired temperature. Addition of the lime causes precipitation of zinc oxide. Gypsum will also be formed. Careful control of the precipitation parameters results in the zinc oxide forming with a crystal structure that allows for easy separation of the zinc oxide from the precipitated gypsum by virtue of differences in the size of the zinc oxide particles and the gypsum particles. This aspect of the zinc oxide precipitation process (to produce the zinc oxide precipitate with physical properties that allow for easy separation from gypsum) is well known to person is skilled in the art, but it is believed that the operating conditions to prevent precipitation of magnesium are unique.

The slurry 20 of liquid and precipitated solids from zinc oxide precipitation step I is sent to zinc oxide separator J, which suitably may be in the form of a cyclone. In this separator J, the solids are separated into a fine overflow stream (e.g. sub 30 μm) 21 (which contains approximately 70% zinc and approximately 2 percent calcium, equating to 95 to 99% recovery of the zinc oxide) and a coarse underflow stream (e.g. plus 30 μm stream) (which contains approximately 2% zinc and the bulk of the remainder being gypsum).

The zinc oxide stream 21 is sent to zinc oxide thickener K. A flocculating agent may be added. The thickened zinc oxide stream 22 obtained therefrom is sent to the zinc oxide filter L. Wash water is used to wash the filter cake to remove any soluble contaminants such as chlorine. The filtrate 23 is subsequently returned to the zinc oxide thickener K or a portion of the flow may be bled to control accumulation of deleterious minor elements. A zinc oxide containing filter cake 24 is then sent to stockpile. The zinc oxide filter cake may be sold as a concentrate suitable for recovery of zinc therefrom.

Returning now to the zinc oxide separator J, the underflow is split into recycle streams 15 and 25. Stream 15 may be returned to an iron polishing stage for recovery of contained zinc and neutralisation duty. Stream 25 is recycled to permit seeding of the gypsum crystal facilitating improved separation of zinc oxide and gypsum at the zinc oxide separator. If hydrated lime slurry is used, stream 25 is recycled to the hydrated lime stock tank. If CaO is used, stream 25 is recycled to the zinc oxide precipitator.

Figure 2:
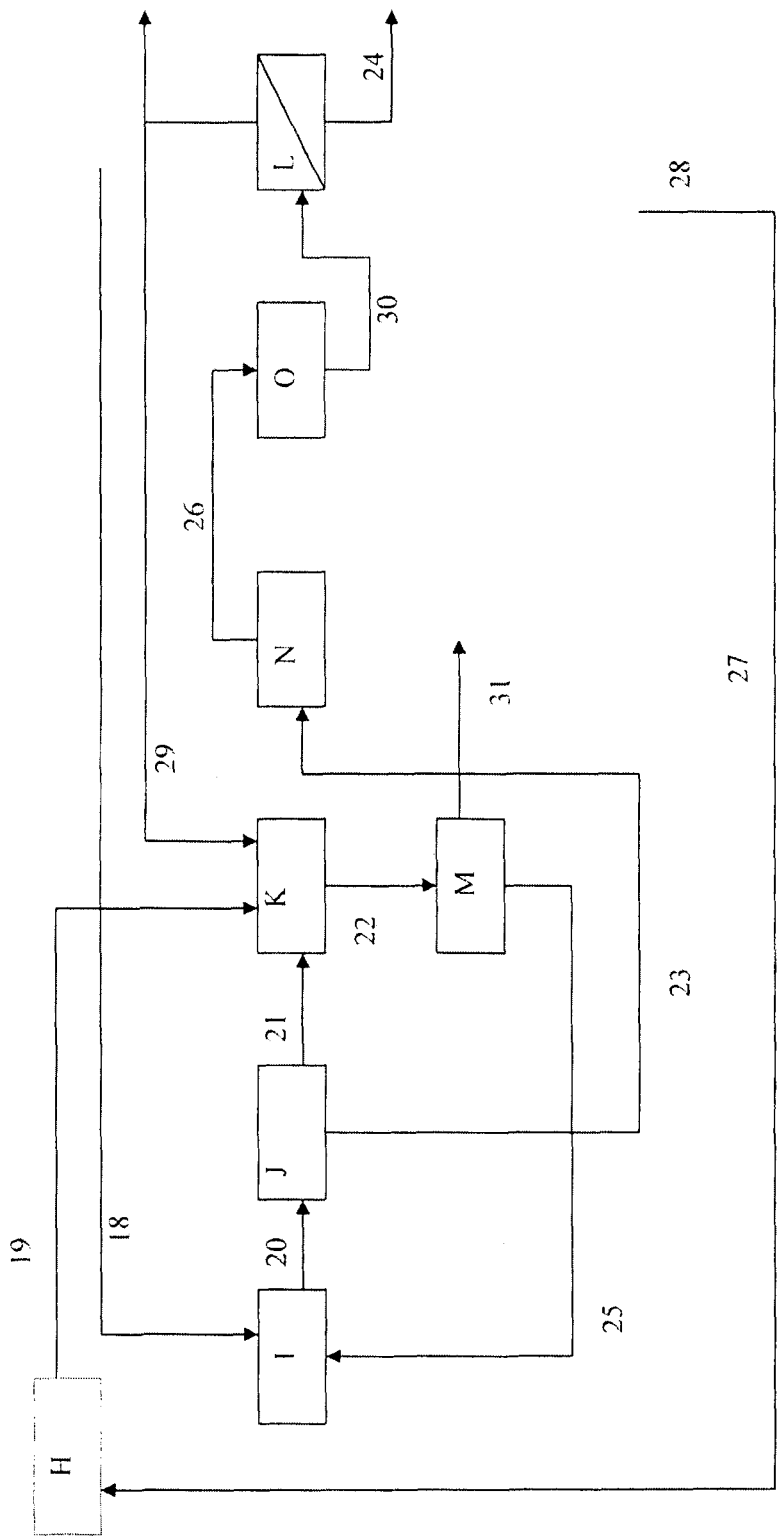

FIG. 2 shows zinc precipitation using a process that produces a zinc carbonate precipitate. In the process shown in FIG. 2, the pregnant leach solution 18 may be subsequently fed to re-treated solids reactor I. In this reactor, fresh PLS feed 18 is contacted with the precipitate formed in zinc precipitator K to remove any unreacted limestone. In reactor I, the dominating reaction is that of acid in the fresh PLS feed (18) (which contains zinc sulphate) and unreacted limestone. As such very little zinc is precipitated. The process can operate at a pH range of 4.5-5.5 but preferably 5.0 and at a temperature of from 70-90° C. The slurry 20 from I, is sent forward to thickener, J. The overflow 21 from thickener J is sent forward to zinc precipitation with limestone K. The underflow 23 from thickener J is sent forward for gravity separation, N, which may include a preceding step to polish any zinc from solution using hydrated lime. Returning now to zinc precipitator K, overflow 21 from thickener J, is contacted with limestone, 19, to precipitate zinc carbonate and gypsum also leaving unreacted limestone in the solids. The slurry 22 from zinc precipitator K, is sent to the zinc precipitate thickener, M. The overflow 31 of thickener M, may contain a small amount of dissolved zinc and can be recovered in the abovementioned hydrated lime polishing stage. The underflow 25 from thickener M, containing zinc carbonate, gypsum and unreacted limestone is returned to the residual limestone reactor, I.

The slurry 23 of liquid and precipitated solids from zinc carbonate precipitation step I is sent to zinc precipitate separator N, which suitably may be in the form of a cyclone. In this separator N, the solids are separated into a fine overflow stream (e.g. sub 30 μm) 26 (which contains approximately 50% zinc and approximately 4 percent calcium, equating to 90 to 95% recovery of the zinc carbonate) and a coarse underflow stream (e.g. plus 30 μm stream) (which contains approximately 4% zinc and the bulk of the remainder being gypsum).

The zinc carbonate stream 26 is sent to zinc precipitate thickener O. A flocculating agent may be added. The thickened zinc carbonate stream 30 obtained therefrom is sent to the zinc carbonate filter L. Wash water is used to wash the filter cake to remove any soluble magnesium and zinc which can be recycled to the process. The filtrate 29 is returned to the process in the absence of zinc polishing prior to filtration as there will still be some zinc in solution or a portion of the flow may be bled to control accumulation of deleterious minor elements such as magnesium. A zinc carbonate containing filter cake 24 is then sent to stockpile. The zinc carbonate filter cake may be sold as a concentrate suitable for recovery of zinc therefrom.

Returning now to the zinc carbonate separator N, the underflow is split into recycle streams 27 and 28. Stream 28 may be returned to an iron polishing stage (which may form part of an overall leaching circuit) for recovery of contained zinc and neutralisation duty. Stream 27 is recycled to permit seeding of the gypsum crystal facilitating improved separation of zinc carbonate and gypsum at the zinc carbonate separator.

In the embodiments described with reference to FIG. 1 and FIG. 2, the solution is being treated derived from leaching of a lead slag. The leach solution had the approximate composition as set out below:

Dissolved zinc—50 g/L
Dissolved iron—0.1 g/L
Dissolved magnesium—3 g/L
Dissolved calcium—600 ppm
Minor amounts of dissolved chlorine, fluorine and lead.

Treating the leach solution in accordance with the present invention resulted in a zinc-containing concentrate having low levels of magnesium being formed. When treated in accordance with the embodiment shown in FIG. 1, a zinc oxide concentrate was formed. When treated in accordance with the embodiment shown in FIG. 2, a zinc carbonate concentrate was formed.

Those skilled in you will appreciate that the present invention may be susceptible to variations and modifications other than those specifically described. It will be understood that the present invention encompasses all such variations and modifications that fall within its spirit and scope.

The invention claimed is:

1. A method of precipitating a zinc containing solid from an acidic solution containing dissolved zinc and dissolved magnesium comprising contacting the solution with a calcium containing neutralising agent to raise the pH of the solution to 4.5 to 7.5 at a temperature of from 70 to 95° C. to thereby precipitate a solid zinc containing material and gypsum without causing substantial precipitation of magnesium, and separating the zinc containing material from the gypsum.

2. A method as claimed in claim 1 wherein the method comprises contacting the solution with a calcium containing neutralising agent to raise the pH of the solution to 5.5 to 7.5 at a temperature of from 70 to 95° C. to thereby precipitate a solid zinc containing material and gypsum without causing substantial precipitation of magnesium, and separating the zinc containing material from the gypsum.

3. A method as claimed in claim 2 wherein the calcium containing neutralising agent is selected from lime (CaO) or hydrated lime ($Ca(OH)_2$) and zinc in solution is precipitated in the form of zinc oxide.

4. A method as claimed in claim 2 wherein zinc in solution is precipitated as zinc oxide and the method involves a precipitation step that is operated at a pH from 5.5-6.5, and an operating temperature of from 70 to 95° C.

5. A method as claimed in claim 1 wherein the method comprises contacting the solution with a calcium containing neutralising agent to raise the pH of the solution to 4.5 to 6.5, at a temperature of from 70 to 95° C., to precipitate a solid zinc containing material and gypsum without causing substantial precipitation of magnesium, and separating the zinc containing material from the gypsum.

6. A method as claimed in claim 5 wherein the calcium containing neutralising agent comprises limestone ($CaCO_3$) and the zinc in solution is precipitated as zinc carbonate.

7. A method as claimed in claim 6 wherein an amount of limestone added to the method is greater than a stoichiometric amount of limestone required to precipitate the zinc in solution.

8. A method as claimed in claim 7 wherein the amount of limestone added to the method is up to 50% greater than the stoichiometric amount of limestone required to precipitate the zinc in solution.

9. A method as claimed in claim 5 wherein milled limestone is contacted with zinc sulphate solution at pH about 5.5 at a temperature of about 90° C. and the milled limestone has a nominal size of less than 100 µm, to cause precipitation of zinc carbonate and gypsum.

10. A method as claimed in claim 6 wherein a slurry containing precipitated zinc carbonate and gypsum is separated into a zinc carbonate-rich fraction and a gypsum-rich fraction, said gypsum-rich fraction containing precipitated gypsum and unreacted limestone.

11. A method as claimed in claim 10 wherein the zinc carbonate-rich fraction comprises sub 30 µm particles that include a significant proportion of precipitated zinc carbonate and the gypsum-rich fraction comprises +30 µm particles that include a significant proportion of precipitated gypsum and unreacted limestone.

12. A method as claimed in claim 10 wherein the zinc carbonate-rich fraction is sent forward to zinc polishing or for solid/liquid separation.

13. A method as claimed in claim 10 wherein the gypsum-rich fraction is recycled to another reactor or directly to a reaction vessel or thickener, to contact all or a portion of fresh zinc sulphate stream from a leach process to convert unreacted limestone to gypsum.

14. A method as claimed in claim 13 wherein slurry formed in the step of claim 13 is separated into a liquid stream and a solids stream, the liquid stream, which contains dissolved zinc, is sent to zinc precipitation with limestone and the solids stream is sent to zinc solution polishing to remove any zinc from solution or sent straight to separation where precipitated zinc carbonate is separated from precipitated gypsum.

15. A method as claimed in claim 14 wherein the precipitated zinc carbonate reports to a fine fraction and the precipitated gypsum reports to a coarse fraction.

16. A method as claimed in claim 15 wherein the precipitated gypsum is recycled to the method.

17. A method as claimed in claim 15 wherein the precipitated zinc carbonate is subjected to a liquid/solid separation and the solid is washed to remove any magnesium in solution and washed solids are recovered as a zinc carbonate concentrate.

18. A method as claimed in claim 1 wherein precipitated zinc containing compound is separated from gypsum by flotation, granulometric sizing or a combination of flotation and granulometric sizing.

19. A method of precipitating a zinc containing solid from an acidic solution containing dissolved zinc and dissolved magnesium comprising contacting the solution with a calcium containing neutralising agent to raise the pH of the solution to 4.5 to 7.5 at a temperature of from 70 to 95° C. to thereby precipitate a solid zinc containing material and gypsum without causing precipitation of magnesium, and separating the solid zinc containing material from the gypsum.

* * * * *